Feb. 15, 1966     E. KROG-JENSEN     3,235,861
MONITORING SYSTEM FOR MONITORING THE POTENTIAL OF CONDUCTORS
Filed Oct. 6, 1960                       2 Sheets-Sheet 1
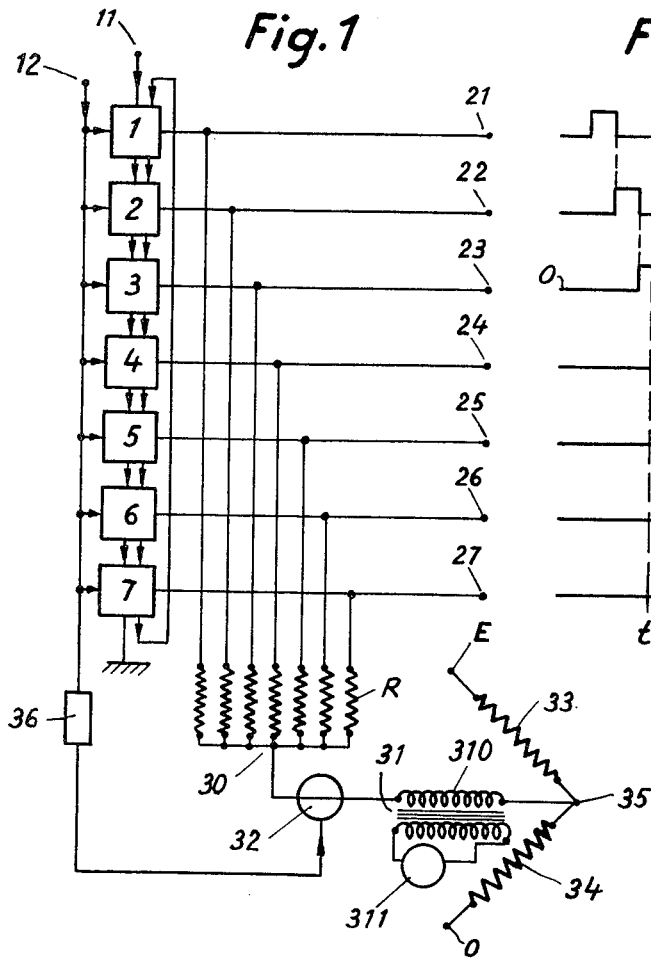
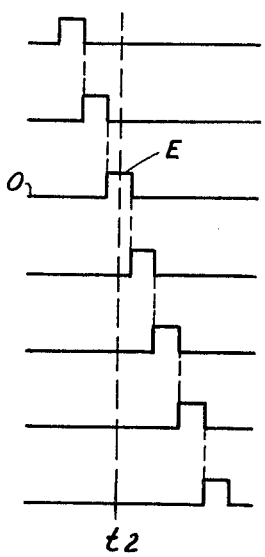
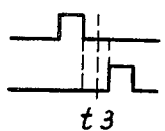
INVENTOR
ERLING KROG-JENSEN
By Hane and Nydick
ATTORNEYS

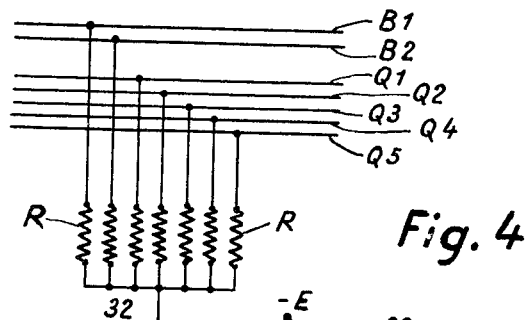
Fig. 4
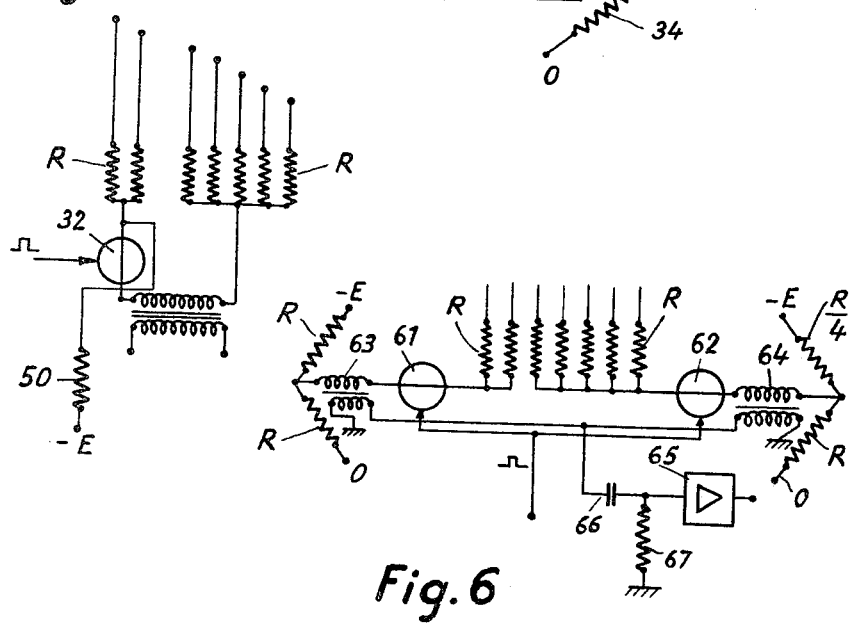
Fig. 5
Fig. 6

United States Patent Office 3,235,861
Patented Feb. 15, 1966

3,235,861
MONITORING SYSTEM FOR MONITORING THE POTENTIAL OF CONDUCTORS
Erling Krog-Jensen, Hagersten, Sweden, assignor to Telefonaktiebolaget L M Ericsson, Stockholm, Sweden, a corporation of Sweden
Filed Oct. 6, 1960, Ser. No. 60,869
Claims priority, application Sweden, Oct. 22, 1959, 9,826/59
3 Claims. (Cl. 340—248)

The present invention relates to an arrangement for monitoring the potential of a number of conductors. More exactly such cases are intended when a stated number of conductors shall normally have a fixed first potential and the remaining conductors shall have a fixed second potential. It may be mentioned as an example that in connection with stepping chains it is of great importance to be able to determine whether at some point of time a too large or too small number of conductors of a respective chain is at a potential or not. If, for instance, there is a chain with eight steps, which shall give pulses successively but never at the same time, there is a need of a simple and reliable monitoring arrangement, from which a fault signal is obtained when two or more steps give pulses at the same time. The purpose of the invention is to provide a monitoring arrangement for such objects. An arrangement, according to the invention, for monitoring the potential of a number of conductors is characterized by impedances connected to said conductors, which impedances together with one or several further impedances are an integral part of a bridge circuit, in which two opposite diagonal points have potentials corresponding to said first and second potential, while a circuit for giving a fault signal at unbalance in the bridge circuit caused by a wrong potential of one or more of the conductors is connected between the two remaining diagonal points.

The invention will be further described in connection with the attached drawings, where FIG. 1 schematically shows a stepping chain with a monitoring arrangement according to the invention, FIG. 2 and FIG. 3 show pulse diagrams for the chain in FIG. 1, FIG. 4 shows an arrangement with two groups of output conductors and an associated monitoring arrangement, FIG. 5 shows a modification of the arrangement according to FIG. 4, and finally, FIG. 6 shows the use of two monitoring arrangements connected together.

The stepping chain in FIG. 1 comprises seven steps 1–7 which in a known way are fed with ignition pulses at 11 and extinguishing pulses at 12. As the chain steps forward a certain potential E is obtained on one of the output conductors 21–27, while the potential of the other output conductors is zero, see the pulse diagram in FIG. 2.

Resistances R are connected at one end to the output conductors 21–27, one resistance for each conductor. The resistance value of these, among themselves similar resistances, is such that they do not adversely affect the stepping of the chain. The other ends of the resistances are connected together thereby connecting the resistances in parallel. The common point 30 constitutes one corner or point of a four-armed bridge, which has at two of its opposite corners potentials corresponding to the potentials E and 0 of the output conductors and which comprises two outer resistances 33 and 34 having the resistance value R and R/6 respectively connected to said two opposite corners E and 0.

The connection point 35 between the last mentioned resistances 33 and 34 is connected to the point 30 through a network 31 for giving fault signals and a pulse controlled gate 32.

When the chain 1–7 steps in the intended way the similar resistances R will be connected to the two bridge arms having the resistance values R and R/6, irrespective which one of the output conductors has at the present moment the potential E. Consequently the point 30 and the point 35 in the bridge will have the same potential, and no fault signal will be given by the network 31. However, if for instance two output conductors at the same time should have the potential E, the balance of the bridge is disturbed and a fault signal is obtained. The testing of the output conductors should be effected when the potential on one output conductor has reached its full value, that is, at the time $t2$ in the diagram according to FIG. 2, and not exactly during the transition from the potential E to the zero potential for one output conductor. To obtain such timing, the pulse controlled gate 32 is provided, which gate via a time delay element 36 receives suitable starting impulses from the input terminal 12. When there is a considerable distance of time between the potential pulses that appear at the output conductors, see FIG. 3, it is important that gate 32 is controlled so that the testing does not occur for instance at the fixed time point $t3$. The network 31 consists of a conventional combination of a transformer 310 and an indicator 311. It is evident that the circuit according to FIG. 1 operates as well if for instance two of the output conductors at the same time should lead the potential E, provided only the resistances 33 and 34 are accordingly dimensioned, namely are given resistance values R/2 and R/5 respectively.

Practical experiments have shown that with $R=5.6$ K$\Omega$ and $E=6$ v. the arrangement according to FIG. 1 can advantageously be used for chains with for instance 15 steps and that the balance of the bridge is rather uncritical so that 20% tolerance on the values of the bridge resistances are permissible.

In FIG. 4 an arrangement for monitoring the potential on a number of output conductors is shown, which conductors are divided in two groups, in a manner such the arrangement satisfies the condition that one and only one output conductor in each group shall have a certain potential, for instance 0, that is, a so called biquinary code, while all other output conductors are at a different but equal potential, for instance —E. The information fed to the output conductors can consist of continuous direct voltage potentials or short pulses and it is presumed that at a certain point of time the whole information is available and that only one fault appears at a time. Earlier known arrangements for such monitoring require a considerable number of diodes and resistances, and therefore in comparison with the arrangement according to FIG. 4, the latter is obviously more reliable and cheaper. The output conductors are divided in two groups B1, B2 and Q1–Q5, and the required condition is that one of the conductors B1, B2 and one of the conductors Q1–Q5 shall have the potential 0. The bridge circuit is the same as in FIG. 1, but the resistances 33 and 34 have now the resistance value R/5 and R/2 respectively. The arrangement works so that if only one of all the conductors has the potential 0 for instance a negative fault signal is obtained; if two conductors have the potential 0 no fault signal is obtained as the bridge then is in balance, and if three conductors have the potential 0 a positive fault signal is obtained.

The arrangement according to FIG. 4 has the drawback that if two of the output signals have the potential 0 but these two belong to the same group of output conductors, this fault will not be indicated. For such condition the modification according to FIG. 5 is suitable, where all resistances R from each group of output conductors are connected parallel to each other at their ends opposite to those connected to the group of output conductors in question. Except for the seven resistances R there is only one further resistance 50 in the bridge, the resistance value of which is R/3 and one end of which is connected to the potential —E. If the information fed to the output conductors consists of pulses only, which are fed at the same time, the gate 32 may be omitted, but then no indication (fault signal) is obtained when all the pulses fail.

For the case of two faults at the same time in the two groups together, which faults perhaps would compensate each other, two bridges are suitably used, that is, there is a separate bridge circuit for each group of output conductors. It is then possible to have different amplitude and polarity for the two groups of output conductors. Such an arrangement is shown in FIG. 6, in which the magnitude of the required further resistances is given in the figure. The units 61 and 62 are pulsed gates, and the secondary windings of the transformers 63 and 64 are connected in parallel to an amplifier 65 through a differentiation circuit consisting of a condenser 66 and a resistance 67. As a result, the same amplifier can be used for a positive as well as a negative fault signal.

It is evident that many modifications may be made without departing from the scope of invention. The character of the information, which shall be controlled, determines the number and magnitude of the elements forming an integral part of the bridge circuit and the necessary voltages. In that way it is for instance possible to exchange the resistance bridge circuit described in the foregoing for an inductance- or capacitance bridge. Therefore it is not possible to mention all the coupling variations which are possible and necessary for the cases existing in practice.

I claim:

1. In combination with N conductors, where N is an integer greater than two, wherein each of said conductors can be only at a first voltage or a second voltage, apparatus for indicating when more than M of said conductors is at said first voltage, where M is an integer less than N, comprising N impedors, each of said impedors having first and second terminals, each of said impedors having the same impedance of X ohms, means for connecting the first terminal of each of said impedors to one of said N conductors, respectively, a first junction means, means for connecting the second terminals of all of said impedors to said first junction means, a first fixed impedor having first and second terminals, said first fixed impedor having an impedance of $(X/M)$ ohms, a first voltage source having said first voltage, means for connecting the first terminal of said first fixed impedor to said first voltage source, a second fixed impedor having first and second terminals, said second fixed impedor having an impedance of $(X/N-M)$ ohms, a second voltage source having said second voltage, means for connecting the first terminal of said second fixed impedor to said second voltage source, a second junction means, means for connecting the second terminals of said first and second fixed impedors to said second junction means, current detector means including first and second terminals for giving an indication when current flows from one of said terminals to the other of said terminals, means for connecting the first terminal of said current detector means to one of said junction means, and means for connecting the second terminal of said current detector means to the other of said junction means.

2. In combination with N conductors, where N is an integer greater than two, wherein each of said conductors can be only at a first voltage or a second voltage, apparatus for indicating when more than M of said conductors is at said first voltage, where M is an integer less than N, comprising N impedors, each of said impedors having first and second terminals, each of said impedors having the same impedance of X ohms, means for connecting the first terminal of each of said impedors to one of such N conductors, respectively, a first junction means, means for connecting the second terminals of all of said impedors to said first junction means, a first fixed impedor having first and second terminals, said first fixed impedor having an impedance of $(X/M)$ ohms, a first voltage source having said first voltage, means for connecting the first terminal of said first fixed impedor to said first voltage source, a second fixed impedor having first and second terminals, said second fixed impedor having an impedance of $(X/N-M)$ ohms, a second voltage source having said second voltage, means for connecting the first terminal of said second fixed impedor to said second voltage source, a second junction means, means for connecting the second terminals of said first and second fixed impedors to said second junction means, current detector means including first and second terminals for giving an indication when current flows from one of said terminals to the other of said terminals, gating means for controllably connecting the first terminal of said current detector means to one of said junction means, and means for connecting the second terminal of said current detector means to the other of said junction means.

3. In combination with N conductors, where N is an integer greater than two, wherein each of said conductors can be only at a first voltage or a second voltage, apparatus for indicating when more than one of said conductors is at said first voltage, comprising N resistors, each of said resistors having first and second terminals, each of said resistors having the same resistance of R ohms, means for connecting the first terminal of each of said resistors to one of said N conductors, respectively, a first junction means, means for connecting the second terminals of all of said resistors to said first junction means, a first fixed resistor having first and second terminals, said first fixed resistor having a resistance of R ohms, a first voltage source having said first voltage, means for connecting the first terminal of said first fixed resistor to said first voltage source, a second fixed resistor having first and second terminals, said second fixed resistor having a resistance of $(R/N-1)$ ohms, a second voltage source having said second voltage, means for connecting the first terminal of said second fixed resistor to said second voltage source, a second junction means, means for connecting the second terminals of said first and second fixed resistors to said second junction means, current detector means including first and second terminals for giving an indication when current flows from one of said terminals to the other of said terminals, means for connecting the first terminal of said current detector means to one of said junction means, and means for connecting the second terminal of said current detector means to the other of said junction means.

References Cited by the Examiner

UNITED STATES PATENTS

| | | | |
|---|---|---|---|
| 2,623,916 | 12/1952 | Welz | 324—114 |
| 2,691,889 | 10/1954 | Dion et al. | 340—233 XR |
| 2,724,108 | 11/1955 | Hayes et al. | 340—253 |
| 3,067,411 | 12/1962 | Dhimos | 340—253 XR |

NEIL C. READ, *Primary Examiner.*

BENNETT G. MILLER, *Examiner.*